(12) United States Patent
Fujimura et al.

(10) Patent No.: US 10,481,480 B2
(45) Date of Patent: Nov. 19, 2019

(54) REFLECTION-TYPE SCREEN AND SHEET FOR REFLECTION-TYPE SCREEN

(71) Applicant: NICCA CHEMICAL CO., LTD., Fukui-shi, Fukui (JP)

(72) Inventors: Tadamasa Fujimura, Tokyo (JP); Shigeru Shiozaki, Tokyo (JP)

(73) Assignee: NICCA CHEMICAL CO., LTD., Fukui-Shi, Fukui (JP)

(*) Notice: Subject to any disclaimer, the term of this patent is extended or adjusted under 35 U.S.C. 154(b) by 0 days.

(21) Appl. No.: 16/077,513

(22) PCT Filed: Feb. 22, 2017

(86) PCT No.: PCT/JP2017/006572
§ 371 (c)(1),
(2) Date: Aug. 13, 2018

(87) PCT Pub. No.: WO2017/146093
PCT Pub. Date: Aug. 31, 2017

(65) Prior Publication Data
US 2019/0049835 A1   Feb. 14, 2019

(30) Foreign Application Priority Data
Feb. 25, 2016   (JP) ................. 2016-048933

(51) Int. Cl.
*G03B 21/60* (2014.01)
*G03B 21/62* (2014.01)
(Continued)

(52) U.S. Cl.
CPC ........... *G03B 21/60* (2013.01); *G02B 5/0278* (2013.01); *G03B 21/602* (2013.01); *G03B 21/62* (2013.01); *G03B 21/625* (2013.01)

(58) Field of Classification Search
CPC ....................................... G03B 21/60
(Continued)

(56) References Cited

U.S. PATENT DOCUMENTS 5,148,309 A * 9/1992 Yamada ............... G03B 21/604
   359/443
5,179,469 A * 1/1993 Hall ....................... G02B 1/10
   359/360

(Continued)

FOREIGN PATENT DOCUMENTS

JP   H2-055202 U      4/1990
JP   H6-36049    * 10/1992 ............. G03B 21/60

(Continued)

OTHER PUBLICATIONS

David W. Hahn, Light Scattering Theory, Department of Mechanical and Aerospace Engineering University of Florida, Jul. 2009, 13 pages (Year: 2009).*

(Continued)

*Primary Examiner* — Clayton E. LaBalle
*Assistant Examiner* — Kevin C Butler
(74) *Attorney, Agent, or Firm* — Leydig Voit & Mayer, Ltd.

(57) ABSTRACT

A reflective screen (1) displaying an image by projected light, comprises: a transparent substrate (10); a light-absorption layer (20) provided on the transparent substrate, the light-absorption layer reflecting the projected light; and a scattering layer (30) provided on the light-absorption layer, the scattering layer scattering the projected light, wherein the light-absorption layer has 30-90% transmittance with respect to visible light, and the scattering layer contains a light-scatterer (31) consisting of diamond particles and/or metallic inorganic particles.

11 Claims, 12 Drawing Sheets

(51) Int. Cl.
*G03B 21/625* (2014.01)
*G03B 21/602* (2014.01)
*G02B 5/02* (2006.01)

(58) Field of Classification Search
USPC ..... 359/452, 267, 449, 459, 485.04, 487.02, 359/493.01, 572, 584, 589
See application file for complete search history.

(56) References Cited

U.S. PATENT DOCUMENTS

| | | | | |
|---|---|---|---|---|
| 5,694,240 | A * | 12/1997 | Sternbergh | G02B 5/283 |
| | | | | 351/159.62 |
| 5,880,800 | A * | 3/1999 | Mikura | B32B 27/08 |
| | | | | 349/122 |
| 6,381,068 | B1 * | 4/2002 | Harada | G02B 5/0215 |
| | | | | 359/443 |
| 6,808,806 | B2 * | 10/2004 | Phillips | B05D 5/061 |
| | | | | 106/456 |
| 7,193,776 | B2 * | 3/2007 | Nojima | G03B 21/60 |
| | | | | 359/443 |
| 8,081,379 | B2 * | 12/2011 | Okamoto | G03B 27/56 |
| | | | | 353/84 |
| 2001/0008464 | A1 * | 7/2001 | Ouderkirk | B32B 27/36 |
| | | | | 359/489.15 |
| 2004/0233524 | A1 * | 11/2004 | Lippey | G02B 5/0816 |
| | | | | 359/443 |
| 2005/0141086 | A1 * | 6/2005 | Maruta | G03B 21/60 |
| | | | | 359/449 |
| 2005/0141091 | A1 * | 6/2005 | Maruta | G03B 21/60 |
| | | | | 359/485.04 |
| 2005/0207137 | A1 * | 9/2005 | Nishikawa | G06F 3/041 |
| | | | | 362/84 |
| 2005/0280898 | A1 * | 12/2005 | Oshima | G02B 5/26 |
| | | | | 359/614 |
| 2007/0035827 | A1 * | 2/2007 | Shimoda | G03B 21/602 |
| | | | | 359/449 |
| 2009/0141348 | A1 * | 6/2009 | Maruta | G03B 21/56 |
| | | | | 359/449 |
| 2014/0211303 | A1 * | 7/2014 | Banerjee | G02B 5/085 |
| | | | | 359/359 |

FOREIGN PATENT DOCUMENTS

| | | | |
|---|---|---|---|
| JP | H6-036049 U | 5/1994 | |
| JP | H036049 | * 5/1994 | ............ G03B 21/60 |
| JP | 2005-208557 A | 8/2005 | |
| JP | 2009-109836 A | 5/2009 | |
| JP | 2011-113068 A | 6/2011 | |
| JP | 2015-043046 A | 3/2015 | |
| JP | 2015-075724 A | 4/2015 | |
| JP | 2015075724 | * 4/2015 | ............ G02B 3/08 |
| JP | 2016-009149 A | 1/2016 | |

OTHER PUBLICATIONS

A.J. Cox et Al., An experiment to measure Mie and Rayleigh total scattering cross sections, American Association of Physics Teachers, Feb. 7, 2002, 6 pages (Year: 2002).*
Changsik Kim et al., Simple Mathematical Expressions for Spectral Extinction and Scattering Properties of Small size-parameter particles, including examples for soot and TiO2, Elsevier Science Ltd, Jul. 27, 1995, 21 pages (Year: 1995).*
International Bureau, International Search Report in International Application No. PCT/JP2017/006572, dated May 23, 2017.
International Bureau, International Preliminary Report on Patentability in International Application No. PCT/JP2017/006572, dated Sep. 7, 2018.

* cited by examiner

REFLECTION-TYPE SCREEN AND SHEET FOR REFLECTION-TYPE SCREEN

CROSS-REFERENCE TO RELATED APPLICATIONS

This patent application is the U.S. National Stage of International Patent Application No. PCT/JP2017/006572, filed Feb. 22, 2017, which claims the benefit of Japanese Patent Application No. 2016-048933, filed Feb. 25, 2016, which are each incorporated by reference.

TECHNICAL FIELD

The present invention relates to a reflective screen and a sheet for a reflective screen.

BACKGROUND ART

In the field of image display, video display devices represented by liquid crystal projectors are commonly used as means for easily obtaining a large-screen image at a low cost and often used mainly when a presentation is made while many people look at the same screen, such as conferences and press releases for products. In addition, digital signage (electronic sign board) is used to introduce products and promote stores.

Since the digital signage does not require embodied products such as posters and signboards, flexible display expressions are made possible in real time and at low cost. In one form thereof, there is a method of setting a display window or a window glass of a store as a screen and projecting by a projector from the front side of the screen, and this method is suitable for large-scale visual media. Using a reflective screen having both suitable transmissivity and suitable light diffusing properties as such a screen enables display of clear large-screen images and clear moving images while allowing the outside scenery to be seen through the screen.

Patent Literature 1 discloses a transmissive screen consisting of a substrate, a transparent thin film layer provided on the substrate, and a light-scatterer that is contained in the transparent thin film layer and has a median diameter of 0.01-1 μm, wherein the light-scatterer is diamond particulates obtained by subjecting a nanodiamond having a graphite phase obtained by detonation to oxidization treatment, and the transmissive screen has an excellent diffusive reflectivity without degradation of transmission visibility.

Patent literature 2 discloses a transmission projection screen prepared by stacking a metal thin film layer and a light diffusion layer on a thermoplastic resin film, wherein the light diffusion layer consists of a thermoplastic resin and light diffusion particles of 10-60 mass %, and the transmission projection screen is excellent in color clarity (high contrast effect) of a transmission projection image in a bright environment and in hot spot prevention. The metal thin film layer has a multi-layer structure consisting of 1) a low-refractive-index layer that consists of one or more selected from Au, Ag, Cu, Al and $SiO_2$ and has a refractive index of 1.5 or less and 2) a high-refractive-index layer that consists of one or more selected from $WO_3$, $In_2O_3$, $ZrO_2$, ZnO, $SnO_2$, and $TiO_2$ and has a refractive index of 1.65 or greater, and the metal thin film layer has thermal insulation property by reflecting a heat ray. Note that, the transmission projection screen is used to project by a projector from the rear surface of the screen and different from the reflective screen used to project by a projector from the front surface of the screen.

CITATION LIST

Patent Literature

Patent Literature 1: JP 2011-113068 A
Patent Literature 2: JP 2016-9149 A

SUMMARY OF INVENTION

Technical Problem

However, when the transmissive screen described in Patent Literature 1 is used as a reflective screen outdoors during day or under bright illumination, brightness and contrast of a projected image are not sufficient; thus, further improvement is desirable. Further, when the transmission projection screen described in Patent Literature 2 is used as a reflective screen outdoors during day or under bright illumination, a projection image having high brightness and high contrast cannot be obtained, and therefore the transmission projection screen is insufficient as a reflective screen.

Accordingly, an object of the present invention is to provide a reflective screen that has sufficient transparency and can project a clear image excellent in brightness and contrast even outdoors during day or under bright illumination.

Solution to Problem

As a result of intensive studies conducted in view of the aforementioned object, the present inventors have found that a screen prepared by stacking a light-absorption layer or a colored substrate that reflects projected light and has 30-90% transmittance with respect to visible light and a scattering layer that can reflect and scatter a projected image at high efficiency and has a light-scatterer consisting of diamond particles and/or metallic inorganic particles can be used as a reflective screen that has transparency and can project a clear image excellent in brightness and contrast; thus the present inventors conceived the present invention.

Specifically, a reflective screen of the present invention is a reflective screen displaying an image by projected light, the reflective screen comprising: a transparent substrate; a light-absorption layer provided on the transparent substrate, the light-absorption layer absorbing visible light; and a scattering layer provided on the light-absorption layer, the scattering layer scattering the projected light, wherein the light-absorption layer has 30-90% transmittance with respect to visible light, and the scattering layer contains a light-scatterer consisting of diamond particles and/or metallic inorganic particles.

It is preferable that the transparent substrate consist of glass or transparent polymer resin.

It is preferable that the light-absorption layer be a layer consisting of a metal thin film, a dielectric multilayer film, or a film containing dye or pigment.

Another reflective screen of the present invention is a reflective screen displaying an image by projected light, the reflective screen comprising: a colored substrate having 30-90% transmittance with respect to visible light; and a scattering layer provided on the colored substrate, the scattering layer scattering the projected light, wherein the scattering layer contains a light-scatterer consisting of diamond particles and/or metallic inorganic particles.

It is preferable that the colored substrate consist of glass or polymer resin containing dye or pigment.

It is preferable that the scattering layer consist of glass or polymer resin containing a light-scatterer consisting of diamond particles and/or metallic inorganic particles.

It is preferable that the light reflective screen of the present invention include a hard coat layer on its surface.

A sheet for a reflective screen of the present invention is a sheet for a reflective screen displaying an image by projected light, the sheet for a reflective screen comprising: a transparent sheet consisting of transparent polymer resin, the transparent sheet having flexibility; a light-absorption layer provided on the transparent sheet, the light-absorption layer absorbing visible light; and a scattering layer provided on the light-absorption layer, the scattering layer scattering the projected light, wherein the light-absorption layer has 30-90% transmittance with respect to visible light, and the scattering layer contains a light-scatterer consisting of diamond particles and/or metallic inorganic particles.

Another sheet for a reflective screen of the present invention is a sheet for a reflective screen displaying an image by projected light, the sheet for a reflective screen comprising: a colored sheet consisting of polymer resin, the colored sheet having flexibility and 30-90% transmittance with respect to visible light; and a scattering layer provided on the colored sheet, the scattering layer scattering the projected light, wherein the scattering layer contains a light-scatterer consisting of diamond particles and/or metallic inorganic particles.

Advantageous Effects of Invention

The reflective screen of the present invention includes a light-absorption layer or a colored substrate having 30-90% transmittance with respect to visible light and a scattering layer having a light-scatterer consisting of diamond particles and/or metallic inorganic particles and thereby has sufficient transparency and can project a projected image clearly with high brightness during both the day and night under any environment; therefore, the reflective screen can be applied not only to display windows and window glasses of stores, but also to window panes of trains, automobiles, ships, aircrafts, elevators, etc., and transparent top plates of guide display boards, glass cases, tables, counters, etc.

The sheet for a reflective screen of the present invention has the same layer structure as the reflective screen of the present invention, and thereby can easily obtain a function equivalent to the reflective screen of the present invention by being attached to, for example, a plate glass, and a transparent resin plate, and the sheet for a reflective screen can be easily removed when no longer used.

DESCRIPTION OF EMBODIMENTS

Hereinafter, the present invention will be described in detail by preferred embodiments thereof.

Hereinafter, the present invention will be described in detail by preferred embodiments thereof. Note that, the term "transmittance with respect to visible light" as used herein refers to a transmittance measured in accordance with JIS Z8722 (2009) using a spectrophotometer CM-3600d (manufactured by KONICA MINOLTA, INC.) with visible light in a range of 400-700 nm, for example.

[1] Reflective Screen (1) First Aspect

Figure 1:
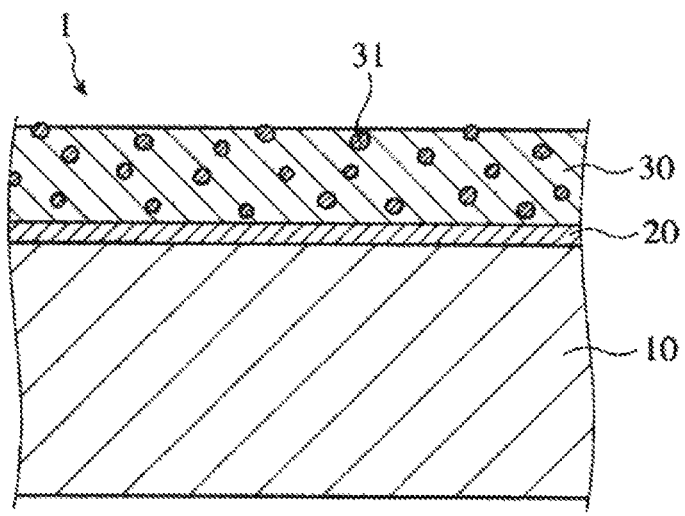
FIG. 1 is a schematic sectional view showing an example of a first aspect of a reflective screen according to the present invention.

FIG. 1 shows a first aspect of a reflective screen displaying an image by projected light. The reflective screen 1 comprises a transparent substrate 10, a light-absorption layer 20 that is provided on the transparent substrate 10 and absorbs visible light, and a scattering layer 30 that is provided on the light-absorption layer 20 and scatters the projected light, wherein the light-absorption layer 20 has 30-90% transmittance with respect to visible light, and the scattering layer 30 contains a light-scatterer 31 consisting of diamond particles and/or metallic inorganic particles. The reflective screen of the present invention projects projection light from the scattering layer 30 side and displays an image on the scattering layer 30, and the image is observed from the same side as the projection light (the scattering layer 30 side). The diamond (a refractive index of 2.4) and the metallic inorganic particles contained in the scattering layer 30 have high refractive indices compared to glass and polymer resin, and accordingly serve as an excellent light-scatterer and exhibit high scattering effect due to Mie scattering, and thus the viewing angle dependence is small; therefore, it is possible to observe the image in a wide range. In addition, while the visible light transmissivity is maintained by the light-absorption layer 20 that is provided on the transparent substrate 10 and has 30-90% transmittance, brightness and contrast of the projected image (reflected image) are enhanced by reducing the intensity of visible light incident from the opposite side of the observation side; therefore, it is possible to observe a clear image.

Figure 2:
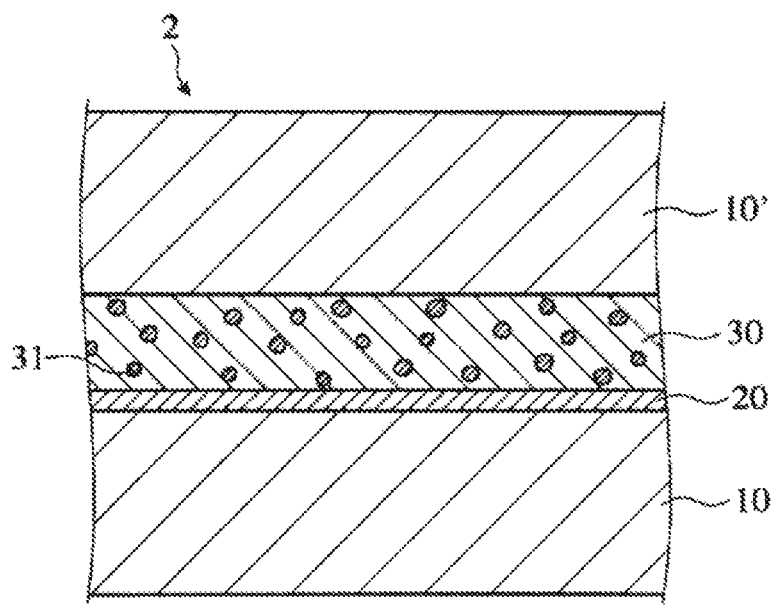
FIG. 2 is a schematic sectional view showing another example of the first aspect of the reflective screen according to the present invention.
Figure 3:
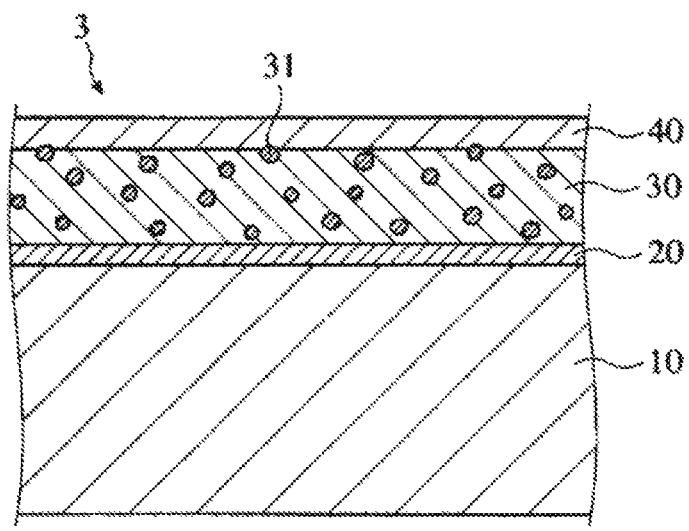
FIG. 3 is a schematic sectional view showing still another example of the first aspect of the reflective screen according to the present invention.

As shown in FIG. 2, the reflective screen of the first aspect may be a reflective screen 2 that has a configuration in which another transparent substrate 10' is further provided on the scattering layer 30 in the reflective screen 1. In this case, an image is projected from the transparent substrate 10' side and observed from the same side. Alternatively, as shown in FIG. 3, the reflective screen of the first aspect may be a reflective screen 3 that has a configuration in which a hard coat layer 40 is further provided on the scattering layer 30. In this case as well, an image is projected from the hard coat layer 40 side and observed from the same side. Further, the hard coat layer may contain the light-scatterer, or a layer containing the light-scatterer may be a hard coat layer. In this manner, it is possible to protect the scattering layer 30 by further providing the other transparent substrate 10' or the hard coat layer 40 on the scattering layer 30.

In the reflective screens 1, 2, 3 of the first aspect, the scattering layer 30 containing the light-scatterer 31 may be provided in direct contact with the light-absorption layer 20 or provided via an adhesive (not shown). Similarly, in the reflective screen 2, the scattering layer 30 containing the light-scatterer 31 may be provided in direct contact with the transparent substrate 10' or provided via an adhesive (not shown), and in the reflective screen 3, the scattering layer 30 containing the light-scatterer 31 may be provided in direct contact with the hard coat layer 40 or provided via an adhesive (not shown).

As with the reflective screen 1, when the scattering layer 30 containing the light-scatterer 31 is in contact with air, that is, when the scattering layer 30 forms the outermost layer, it is preferable that light-scatterer 31 be present such that a part of the light-scatterer 31 protrudes on the surface of the scattering layer 30.

(a) Transparent Substrate

It is preferable that the transparent substrate consist of glass or polymer resin. The transparent substrate may be a flat plate or a curved plate. Alternatively, the transparent substrate may be in a flexible sheet form. As the glass, oxide glasses such as silicate glasses, phosphate glasses, and borate glasses are practical, and in particularly, it is preferable for the glass to be silicate glass, such as silica glass, alkali silicate glass, soda-lime glass, potash-lime glass, lead glass, barium glass, or borosilicate glass.

It is preferable for the polymer resin to be excellent in visible light transmissivity, and examples of usable polymer resins include thermoplastic resins, such as polyvinyl butyral resins, polyester resins, acrylic resins, acrylic urethane resins, polyester acrylate resins, polyurethane acrylate resins, epoxy acrylate resins, urethane resins, epoxy resins, polycarbonate resins, cellulose resins, acetal resins, vinyl resins, polyethylene resins, polystyrene resins, polypropylene resins, polyamide resin, polyimide resins, melamine resins, phenol resins, silicone resins, and fluorine resins, thermo-setting resins, and ionizing radiation curable resins. Plasticizer may be added to the polymer resins. Examples of the plasticizer include triethylene glycol-bis-2-ethyl butyrate.

When a sheet having flexibility is used as a transparent substrate, the sheet may be set as a reflective screen by providing a light-absorption layer and a scattering layer, or a flexible sheet provided with a light absorption layer and a scattering layer may be attached on a surface of plate glass of a display window, for example, to use the display window as a reflective screen. In this case, for example, a possible usage is that the flexible sheet provided with the light absorption layer and the scattering layer is temporarily attached on a plate glass which is usually used as a display window, in order to set the display window as a transparent reflective screen, for an event, for example, and after the event ends, the sheet provided on the display window surface is removed to return the display window to be the original display window.

(b) Light-Absorption Layer

The light-absorption layer may have any configuration, so long as the light-absorption layer is a transmissive layer having 30-90% transmittance with respect to visible light. It is preferable that the transmittance with respect to visible light be 40-80%, and it is more preferable for the transmittance to be 50-70%. Examples of such a light-absorption layer include a layer consisting of a film such as a metal thin film, a dielectric multilayer film, or a film containing dye or pigment. Providing such a light-absorption layer after the scattering layer with respect to projected light enables reduction in the intensity of visible light incident from the opposite side of the observation side, thereby enhancing brightness and contrast of the projected image (reflected image); therefore, it is possible to observe a clear image. In addition, when the light-absorption layer consists of the metal film or the dielectric multilayer film, the projected light is reflected by the light-absorption layer and accordingly the brightness of the reflected image in the scattering layer is further enhanced; therefore, it is possible to project a clear image excellent in brightness and contrast.

It is preferable for the metal thin film to be formed of metal in which reflected light and transmitted light are not colored, and for example, aluminum, tin, silver, rhodium, and stainless steel, are preferable. The metal thin film may be a single-layer thin film consisting of a single metal, especially aluminum, tin, silver, rhodium, or stainless steel, or may be a thin film in which layers consisting of a plurality of kinds of metals are stacked; however, it is preferable that the metal thin film be a single-layer aluminum film, particularly in terms of cost. The metal thin film can be formed by, for example, laminating a metal foil, plating or vapor deposition of metal. Examples of the vapor deposition include methods such as vacuum vapor deposition and sputtering. The thickness of the metal thin film is sufficient provided that it is adjusted such that the transmittance with respect to visible light is 30-90%. Further, adjustment of the transmittance can be performed by removing the metal thin film in an arbitrary or random pattern as well. At this time, the smaller a pitch of the removed pattern is, the better it is, and it is preferable for the pitch to be set in units of microns to millimeters in accordance with the size of the screen. Such a pattern can be formed by a method such as a photoresist or a screen printed resist. Alternatively, such a pattern can be also formed by printing a coating liquid containing metal powders in an arbitrary pattern by an inkjet method.

The dielectric multilayer film is a multilayer reflective film in which a high-refractive-index dielectric thin film and a low-refractive-index dielectric thin film are alternately multilayered, and by adjusting the refractive indices and the optical film thicknesses of the high-refractive-index film and the low-refractive-index film, the transmittance with respect to visible light can be adjusted in such a manner as be 30-90%. Examples of materials forming the high-refractive-index film include $TiO_2$, $Nb_2O_5$, $Ta_2O_5$, and $ZrO_2$, and examples of materials forming the low-refractive-index film include $MgF_2$, $SiO_2$, and $Al_2O_3$. These high-refractive-index film and low-refractive-index film can be formed by physical vapor deposition methods such as a vacuum vapor deposition, sputtering, and ion plating and chemical vapor deposition methods such as thermal CVD, plasma CVD, and photo-CVD, and in particular, the vacuum vapor deposition is preferable. In addition, as described in JP 2015-43046 A, a multilayer reflective film formed by alternately stacking a high-refractive-index film containing nanodiamond and the low-refractive-index film containing silica can be also used. Such a multilayer reflective film can be formed by a simultaneous multiple layer coating and thus is an effective method, particularly when a screen having large area is prepared.

The film containing dye or pigment is not particularly limited, but it is preferable to use dye or pigment having almost no color tone, i.e., gray dye or pigment. Such a film can be formed by applying dye or pigment together with a solvent (dispersion medium) and as needed basis, a binder. Examples of usable coating method include existing methods such as a bar-coating method, a dip-coating method, an inkjet method, a spin-coating method, a spray-coating method, a flow-coating method, and a roller-coating method.

(c) Scattering Layer

As the diamond particles, particles of natural diamonds and particles of artificial diamonds can be used. Examples of the artificial diamonds include single-crystal diamonds and polycrystalline diamonds, and it is preferable for the artificial diamonds to be obtained by subjecting single-crystal diamonds having a graphite phase obtained by detonation to oxidization treatment, for example. The nanodiamonds (nanodiamonds having a graphite phase) obtained by detonation has a core/shell structure in which graphite-based carbon covers surfaces of the diamonds and therefore are colored in black. Thus, it is preferable that the diamond particles be diamond particles from which a graphite phase is almost removed by subjecting to oxidization treatment.

The surfaces of the diamond particles may be modified by silicon or fluorine in order to improve affinity to solvent and the like and used. In particular, fluorinated diamond particles obtained by fluorine treatment of diamond particles are excellent in dispersibility to polymer resin and preferable as the light-scatterer.

The diamond particles are not particularly limited, but it is preferable that the diamond particles have a specific density greater than 3.38 g/cm$^3$ and less than or equal to 3.5 g/cm$^3$. Since the diamond obtained by detonation is a particle having a median diameter of 10 to 250 nm (dynamic light scattering) in which nano-sized diamond having a diameter of about 1 to 10 nm is aggregated, when used as the light-scatterer, it is preferable to further aggregate the diamond for use.

It is preferable that the median diameter of the diamond particles be 0.01 to 1 μm. In particular, in terms of enhancing the contrast, it is preferable that the median diameter of the diamond particles be 1 μm or less, it is more preferable that the median diameter be 0.7 μm or less, and it is even more preferable that the median diameter be 0.4 μm or less. Moreover, in terms of further enhancing the brightness, it is preferable that the median diameter of the diamond particles be 0.01 μm or greater, and it is more preferable that the median diameter be 0.03 μm or greater.

As metallic inorganic particles, particles in which metal oxide or substances other than metal oxide is micronized are used. Examples of metal oxide include zirconium oxide, titanium oxide, zinc oxide, aluminum oxide, cerium oxide, and examples of substances other than metal oxide include barium titanate and barium sulfate. In particular, it is preferable to use zirconium oxide, titanium oxide particles, cerium oxide particles, barium titanate, and barium sulfate particles, in terms of the light-scattering properties, the cohesion of particles, and the production cost. One alone, or two or more kinds in combination of these metallic inorganic particles may be used. Furthermore, the metallic inorganic particles may be used in combination with the aforementioned diamond particles.

Commercially available metallic inorganic particles may be used. For example, as zirconium oxide particles, SZR-W, SZR-CW, SZR-M, SZR-K (which are trade names, manufactured by Sakai Chemical Industry Co., Ltd.) and the like can be suitably used.

The metallic inorganic particles may be solely present as primary particles in glass or polymer resin, but it is preferable to be present in a state where a part thereof is aggregated. Whether the metallic inorganic particles are present solely as the primary particles or in the aggregated state, it is preferable that the median diameter of the metallic inorganic particles be 0.01 to 1 μm. In particular, in terms of further enhancing the contrast, it is preferable that the median diameter of the metallic inorganic particles be 1 μm or less, it is more preferable for the median diameter to be 0.7 μm or less, and it is even more preferable for the median diameter to be 0.4 μm or less. Moreover, in terms of further enhancing the brightness, it is preferable that the median diameter of the metallic inorganic particles be 0.01 μm or greater, and it is more preferable for the median diameter to be 0.03 μm or greater.

It is preferable to form a scattering layer containing a light-scatterer by dispersing the light-scatterer into glass or polymer resin that can be used for the transparent substrate, and in particular, it is preferable for the scattering layer to be formed of polymer resin. When both of the transparent substrate and the scattering layer are made of polymer resins, the polymer resins may be the same or may be different from each other. The thickness of the scattering layer is not particularly limited, but in terms of further enhancing the contrast and the brightness, it is preferable that the thickness of the scattering layer be 0.5 to 1000 μm, it is more preferable for the thickness to be 1 to 500 μm, and it is even more preferable for the thickness to be 2 to 400 μm.

An amount of the light-scatterer contained in the glass or the polymer resin is preferably 0.01 to 20 parts by mass with respect to 100 parts by mass of the glass or the polymer resin, more preferably 0.02 to 10 parts by mass, and even more preferably 0.05 to 6 parts by mass, in terms of enhancing the contrast and the brightness.

The scattering layer may be formed by coating a surface of the light-absorption layer provided on the transparent substrate with a resin solution containing the light-scatterer or formed by attaching a preliminarily prepared sheet consisting of resin containing the light-scatterer on the light-absorption layer. When the scattering layer is formed by coating, it is preferable to use thermosetting resin or UV curable resin. Examples of coating method include a bar-coating method, a dip-coating method, a flow-coating method, a spray-coating method, a spin-coating method, and a roller-coating method.

(d) Hard Coat Layer

The reflective screen may include a hard coat layer on its surface. The hard coat layer is formed by coating the scattering layer with a hard coating agent. An interlayer for improving adhesion may be provided between the hard coat layer and the scattering layer. Examples of the coating method include a bar-coating method, a dip-coating method, a flow-coating method, a spray-coating method, a spin-coating method, and a roller-coating method.

(2) Second Aspect

Figure 4:
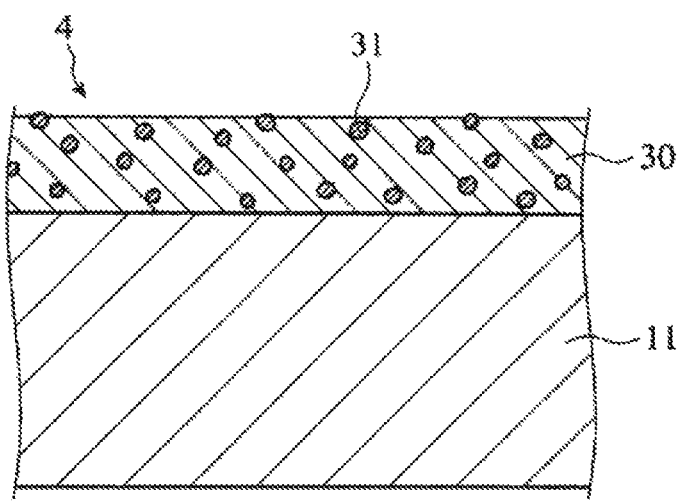
FIG. 4 is a schematic sectional view showing an example of a second aspect of the reflective screen according to the present invention.

FIG. 4 shows a second aspect of the reflective screen displaying an image by projected light. A reflective screen 4 comprises a colored substrate 11 having 30-90% transmittance with respect to visible light and the scattering layer 30 that is provided on the colored substrate 11 and scatters the projected light, wherein the scattering layer 30 contains the light-scatterer 31. As with the reflective screen 1, the reflective screen 4 projects the projection light on the scattering layer 30 from an opposite side of the colored substrate 11 and displays an image on the scattering layer 30, and the image is observed from the same side as the projection light (the scattering layer 30 side). In the reflective screen 4, a substrate itself is colored in such a way as to have 30-90% transmission with respect to visible light and is prepared as the colored substrate 11 instead of providing the light-absorption layer 20 (see FIG. 1) as in the reflective screen 1. This colored substrate 11 maintains the visible light transmissivity and reduces the intensity of visible light incident from the opposite side of the observation side, thereby enhancing brightness and contrast of the projected image (reflected image); therefore, it is possible to observe a clear image. Note that, since the scattering layer 30 is the same as that in the reflective screen 1, the detailed description is omitted.

Figure 5:
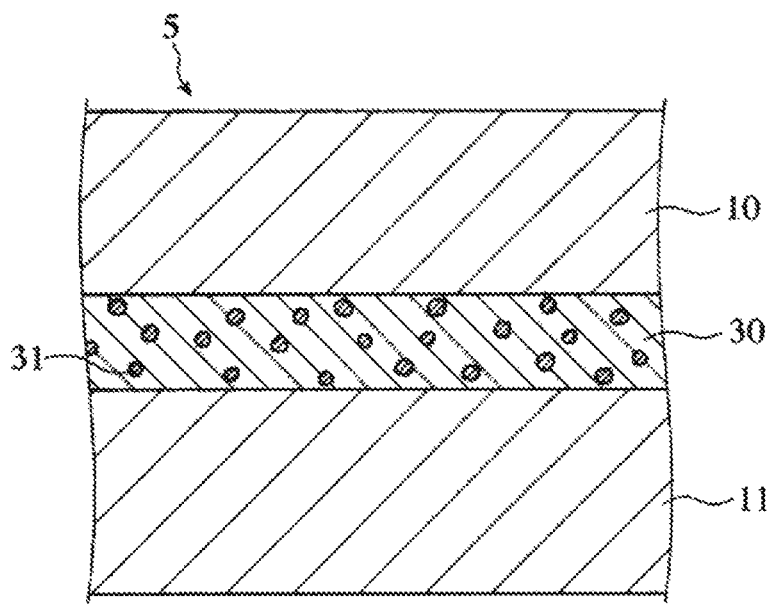
FIG. 5 is a schematic sectional view showing another example of the second aspect of the reflective screen according to the present invention.
Figure 6:
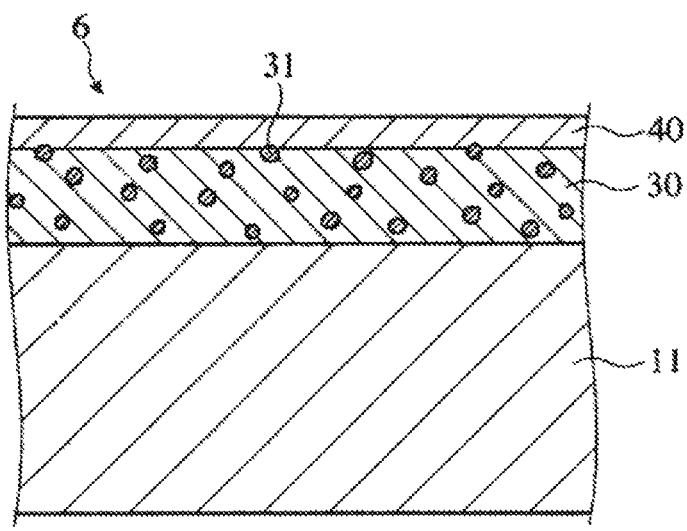
FIG. 6 is a schematic sectional view showing still another example of the second aspect of the reflective screen according to the present invention.

As shown in FIG. 5, the reflective screen of the second aspect may be a reflective screen 5 that has a configuration in which the transparent substrate 10 is further provided on the scattering layer 30 in the reflective screen 4. In this case, an image is projected from the transparent substrate 10 side and observed from the same side. Alternatively, as shown in FIG. 6, the reflective screen of the second aspect may be a reflective screen 6 that has a configuration in which the hard coat layer 40 is further provided on the scattering layer 30. In this case as well, an image is projected from the hard coat layer 40 side and observed from the same side. Further, the hard coat layer may contain the light-scatterer, or a layer containing the light-scatterer may be the hard coat layer. Thus, it is possible to protect the scattering layer 30 by further providing the other transparent substrate 10 or the hard coat layer 40. Note that, since the hard coat layer 40 is the same as that in the reflective screen 1, the detailed description is omitted.

In the reflective screens 4, 5, 6 of the second aspect, the scattering layer 30 containing the light-scatterer 31 may be provided in direct contact with the colored substrate 11 or provided via an adhesive (not shown). Similarly, in the reflective screen 5, the scattering layer 30 containing the light-scatterer 31 may be provided in direct contact with the transparent substrate 10 or provided via an adhesive (not shown). Also, in the reflective screen 6, the scattering layer 30 containing the light-scatterer 31 may be provided in direct contact with the hard coat layer 40 or provided via an adhesive (not shown).

(a) Colored Substrate

It is preferable for the colored substrate to be prepared by coloring a substrate consisting of glass or polymer resin with dye, pigment, or the like. For the substrate consisting of glass or polymer, the examples given as the transparent substrate in the reflective screen 1 can be used. These transparent substrates are colored in such a manner as to have 30-90% transmission with respect to visible light. The dye or pigment is not particularly limited, but it is preferable to use dye or pigment having almost no color tone, i.e., gray dye or pigment.

When a sheet having flexibility is used as a colored substrate, the sheet may be prepared as a reflective screen by providing a light-absorption layer and a scattering layer, or a flexible sheet provided with the light absorption layer and the scattering layer may be attached on, for example, a plate glass surface of a display window, to set the display window as a reflective screen. In this case, for example, a possible usage is that the flexible sheet provided with the light absorption layer and the scattering layer is temporarily attached on a plate glass which is usually used as a display window, in order to use the display window as a transparent reflective screen, for an event, for example, and after the event ends, the sheet provided on the display window surface is removed to return the display window to be the original display window.

[2] Sheet for Reflective Screen (1) First Aspect

Figure 7:
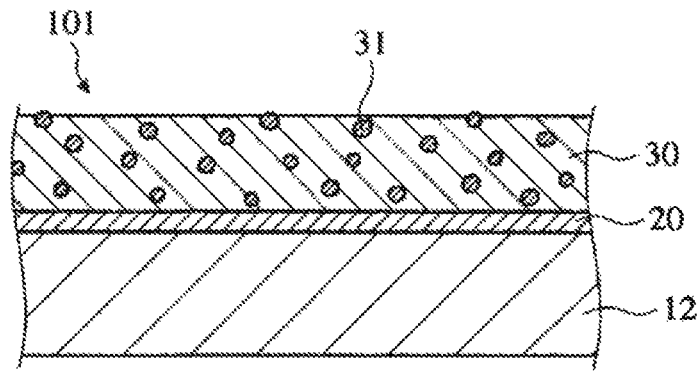
FIG. 7 is a schematic sectional view showing an example of a first aspect of a sheet for a reflective screen according to the present invention.

FIG. 7 shows a first aspect of a sheet for a reflective screen displaying an image by projected light. A sheet for a reflective screen 101 is a sheet to obtain a reflective screen displaying an image by projected light and comprises a transparent sheet 12 that consists of transparent polymer resin and has flexibility, a light-absorption layer 20 that is provided on the transparent sheet 12 and absorbs visible light, and a scattering layer 30 that is provided on the light-absorption layer 20 and scatters the projected light, wherein the light-absorption layer 20 has 30-90% transmittance with respect to visible light, and the scattering layer 30 contains a light-scatterer 31 consisting of diamond particles and/or metallic inorganic particles.

This sheet for a reflective screen 101 limits the transparent substrate 10 of the reflective screen 1 (reflective screen of the first aspect) to the transparent sheet 12 that consists of the transparent polymer resin and has flexibility, and configurations of the light-absorption layer 20 and the scattering layer 30 are the same as those in the reflective screen 1. The transparent polymer resin that can be used for the sheet for a reflective screen 101 may be made of any materials, so long as the materials have flexibility, and the materials that are the same as those of the transparent substrate 10 given as the examples in the reflective screen 1 can be used. In this sheet for a reflective screen 101, an image is projected from the scattering layer 30 side and observed from the same side, as with the reflective screen 1.

Figure 8:
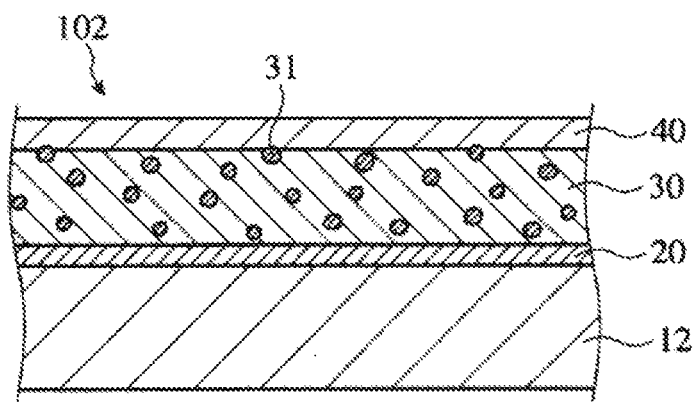
FIG. 8 is a schematic sectional view showing another example of the first aspect of the sheet for a reflective screen according to the present invention.

As shown in FIG. 8, the sheet for a reflective screen of the first aspect may be a sheet for a reflective screen 102 that has a configuration in which the hard coat layer 40 is further provided on the scattering layer 30 in the sheet for a reflective screen 101. This sheet for a reflective screen 102 limits the transparent substrate 10 of the reflective screen 3 to the transparent sheet 12 that consists of transparent polymer resin and has flexibility, and configurations of the light-absorption layer 20, the scattering layer 30, and the hard coat layer 40 are the same as those in the reflective screen 3. In this case as well, an image is projected from the hard coat layer 40 side and observed from the same side. Further, the hard coat layer may contain the light-scatterer, or a layer containing the light-scatterer may be a hard coat layer. Thus, it is possible to protect the scattering layer 30 by further providing the hard coat layer 40 on the scattering layer 30.

These screen sheets for a reflective screen 101, 102 are attached on a transparent substrate like a plate glass to set the transparent substrate as a reflective screen. This kind of usage enables a use method in which these sheets for a reflective screen are attached on a plate glass of a display window to temporarily set the display window as a transparent reflective screen, for an event, for example, and after the event ends, the sheets for the reflective screen attached on the display window surface are removed to return the display window to be the original display window.

(2) Second Aspect

Figure 9:
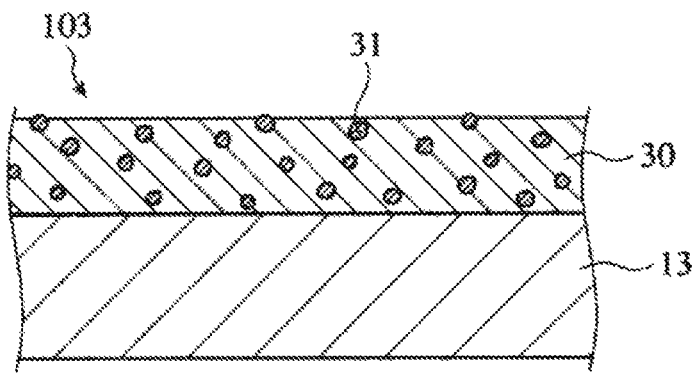
FIG. 9 is a schematic sectional view showing an example of a second aspect of the sheet for a reflective screen according to the present invention.

FIG. 9 shows a second aspect of the sheet for a reflective screen displaying an image by projected light. A sheet for a reflective screen 103 is a sheet to obtain a reflective screen displaying an image by projected light and comprises a colored sheet 13 that consists of polymer resin and has flexibility and 30-90% transmittance with respect to visible light, and a scattering layer 30 that is provided on the colored sheet 13 and scatters the projected light, wherein the scattering layer 30 contains the light-scatterer 31 consisting of diamond particles and/or metallic inorganic particles.

This sheet for the reflective screen 103 limits the colored substrate 11 of the reflective screen 4 (reflective screen of the second aspect) to the colored sheet 13 that consists of the polymer resin and has flexibility and 30-90% transmittance with respect to visible light, and the configuration of the light-absorption layer 20 is the same as that of reflective screen 4. The transparent polymer resin that has 30-90% transmittance with respect to visible light and can be used for the sheet for a reflective screen 103 may be made of any materials, so long as the materials have flexibility, and the materials that are the same as those of the colored substrate 11 given as examples in the reflective screen 4 can be used. In this sheet for the reflective screen 103, an image is projected from the scattering layer 30 side and observed from the same side, as with the reflective screen 4.

Figure 10:
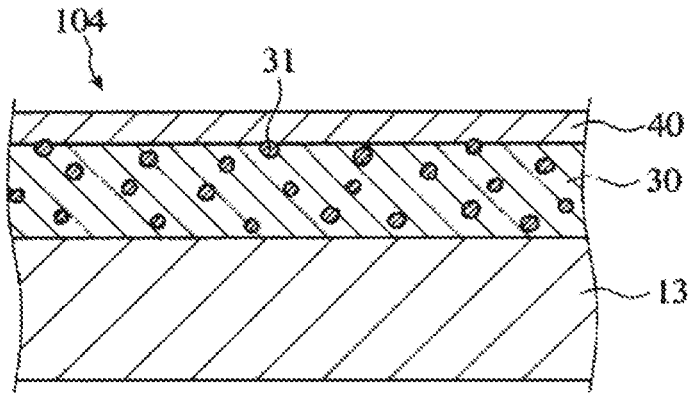
FIG. 10 is a schematic sectional view showing another example of the second aspect of the sheet for a reflective screen according to the present invention.

As shown in FIG. 10, the sheet for a reflective screen of the second aspect may be a sheet for a reflective screen 104 that has a configuration in which the hard coat layer 40 is further provided on the scattering layer 30 in the sheet for a reflective screen 103. This sheet for a reflective screen 104 limits the colored substrate 11 of the reflective screen 6 to the colored sheet 13 that consists of the polymer resin and has flexibility and 30-90% transmittance with respect to visible light, and configurations of the scattering layer 30 and the hard coat layer 40 are the same as those in the reflective screen 6. In this case as well, an image is projected from the hard coat layer 40 side and observed from the same side. Further, the hard coat layer may contain the light-scatterer, or a layer containing the light-scatterer may be a hard coat layer. Thus, it is possible to protect the scattering layer 30 by further providing the hard coat layer 40 on the scattering layer 30.

These sheets for a reflective screen 103, 104 are attached on a transparent substrate like a plate glass to set the transparent substrate as a reflective screen. This kind of usage enables a use method in which these sheets for a reflective screen are attached on a plate glass of a display window to temporarily set the display window as a transparent reflective screen, for an event, for example, and after the event ends, the sheets for a reflective screen attached on the display window surface are removed to return the display window to be the original display window.

[3] Video Display System (1) Overall Configuration

Figure 11:
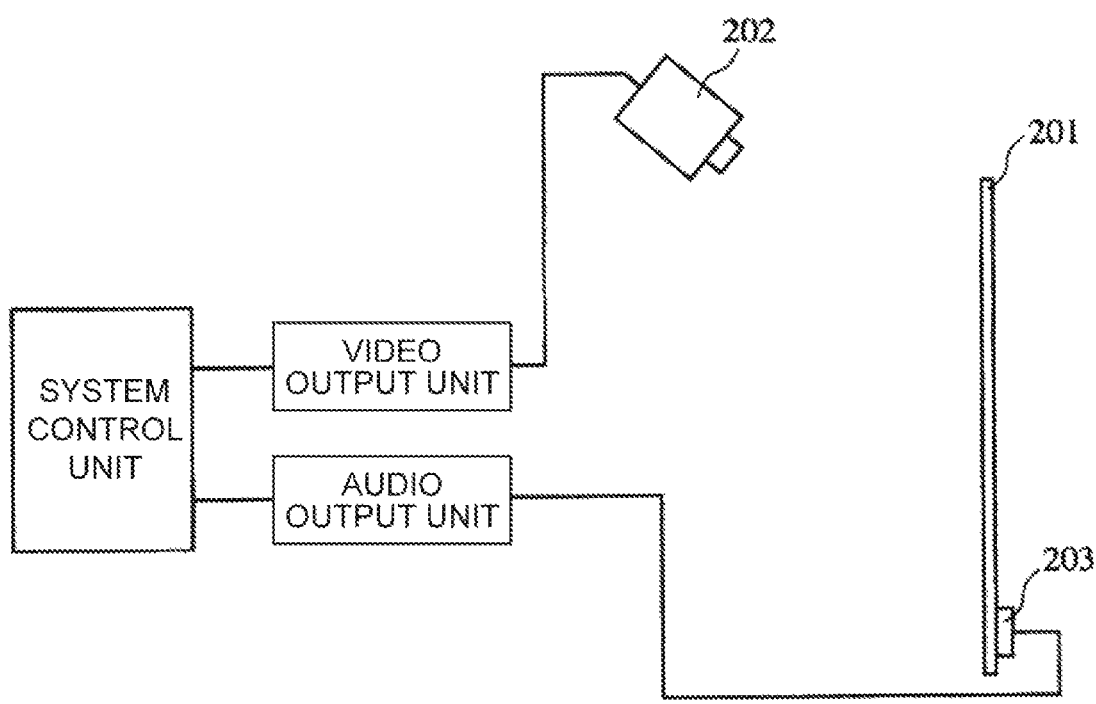
FIG. 11 is a schematic diagram showing an example of a video display system.

A video display system is constructed by using the reflective screen (or the sheet for a reflective screen) of the present invention. As shown in FIG. 11, an exemplary video display system includes a reflective screen 201, a projection device 202 projecting an image or a moving image on the screen, and a vibration speaker 203 having a function of generating sound using the screen as a vibrating body. The projection device 202 and the vibration speaker 203 are respectively connected to a video output unit and an audio output unit and controlled by a system control unit. The vibration speaker 203 may be not provided when it is not necessary.

Figure 12:
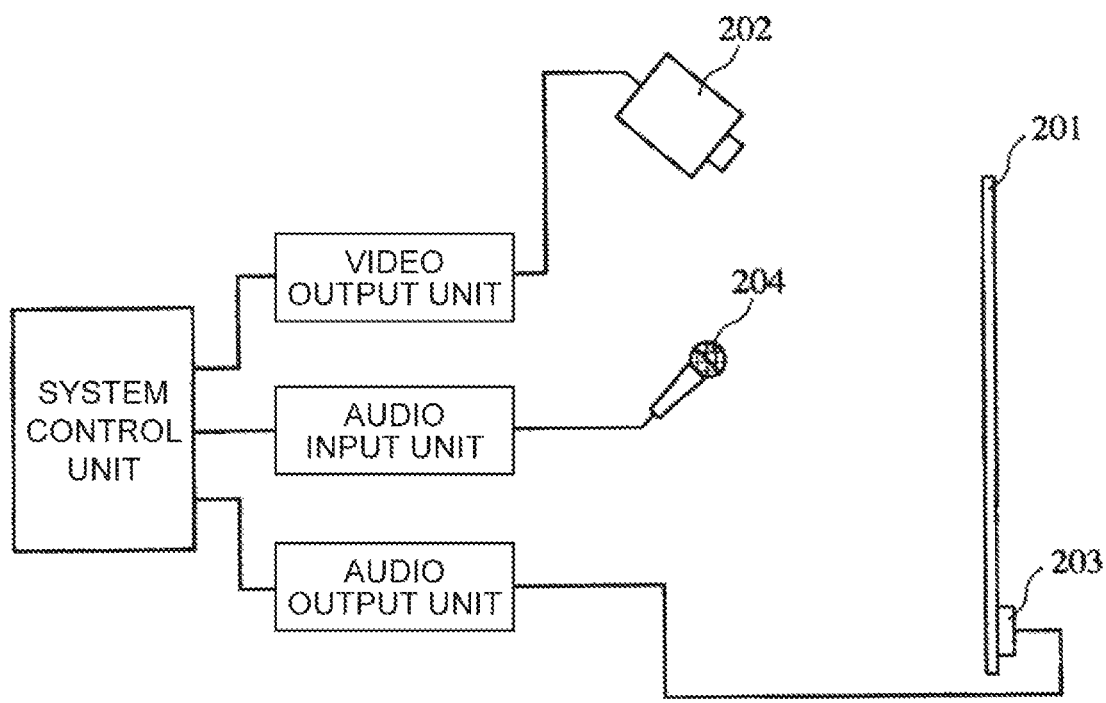
FIG. 12 is a schematic diagram showing another example of the video display system.

As shown in FIG. 12, the video display system may further include a sound-collecting device 204 collecting surrounding sound. The sound-collecting device 204 is connected to the audio input unit and controlled by the system control unit. Further, a phase inverter (not shown) inverting a phase of sound may be further provided in addition to the sound-collecting device 204.

The video display system may further include a communication function. Since the communication function is provided, it is possible to project an image and moving image that are distributed through a LAN line and the like and to send various information input by a user to a server to aggregate the information.

The video display system may further include a touch sensor function. Since the touch sensor function is provided, it is possible not only to provide information unilaterally but also to select information at the will of the user, and information input or the like from the user is enabled.

(2) Reflective Screen

As a reflective screen used for the video display system, the reflective screen of the present invention and a reflective screen obtained by using the sheet for a reflective screen can be used.

(3) Projection Device

The video display system includes the projection device 202 for projecting images and moving images and the like. The projection device 202 processes, in the video output unit, data stored in media such as Blu-ray Disc (BD) and DVD or data distributed through LAN line into an image or a moving image to project the resultant image on the screen. Note that, an electrical signal transmitted from the video output unit to the projection device 202 may be transmitted by wire or transmitted by a wireless device.

(4) Vibration Speaker

The video display system may further include the vibration speaker 203 having a function of generating sound by using the reflective screen as a vibrating body. The vibration speaker 203 is a device that includes a vibrating element formed by an electromagnetic element, a piezoelectric element, or the like converting an electrical signal output from the audio output unit to vibration and vibrating the vibrating body to generate sound and that uses the reflective screen as a speaker by being attached to the reflective screen (window glass, display windows, signboards, panels, and the like). Note that, the electrical signal transmitted from the audio output unit to the vibration speaker 203 may be transmitted by wire or transmitted by a wireless device.

(5) Sound-Collecting Device and Phase Inverter

It is preferable that the video display system further include the sound-collecting device 204 consisting of a sound-collecting microphone collecting surrounding sound. The sound collected by the sound-collecting microphone is input to the system control unit via the audio input unit, and thereafter antiphase noise in which the phase of the collected sound is inverted is generated by the phase inverter that is included in the system control unit and has a function of inverting a sound phase, and the antiphase noise is output from the vibration speaker 203 via the audio output unit, thereby cancelling the surrounding sound by the antiphase noise. That is, exhibiting the noise-cancelling effect allows audience to more clearly listen to music, speech sound, sound effect, and the like from the vibration speaker. Note that, a signal input from the sound-collecting device 204 to the audio input unit may be transmitted by wire or transmitted by the wireless device.

Thus, cancelling the surrounding sound by the antiphase noise enables production of a sound effect (sound masking)

with directivity in which music, speech sound, sound effect and the like are heard better only in a limited area in front of the reflective screen (window glass, display window, sign board, panel, and or like) provided with the vibration speaker 203 and are not heard at a position outside the area.

For example, a glass case for display items in a store or a museum, a display window at a department store, or the like is set as a reflective screen, and the vibration speaker 203 is provided thereto, and thereby it is possible to send guidance messages of works or products only to people standing in front of the glass case for display or the display window, at the volume as a person speaks to the people.

EXAMPLES

Hereinafter, the present invention will be described in further details based on the examples; however, the present invention is not to be limited thereto.

Example 1

(1) Formation of Light-Absorption Layer

An aluminum film was formed on one surface of a transparent glass plate (vertical 30 cm×horizontal 30 cm×thickness 3 mm) with its surfaces ground, by vacuum vapor deposition such that the transmittance with respect to visible light is 60%.

(2) Preparation of Reflective Screen

To 100 parts by mass of a polyvinyl butyral resin (butyralization degree: 65.9 mol %, amount of acetyl group: 0.9 mol %), 40 parts by mass of triethylene glycol-bis-2-ethyl butyrate as a plasticizer and 2 parts by mass of diamond particles (manufactured by Vision Development Co., Ltd, median diameter 360 nm) were added and kneaded with a three roll mill at about 70° C. for about 15 minutes, and thereafter the resultant resin was formed into a film having a thickness of substantially 0.3 mm at 180° C. using an extruder and the film was wound on a roll; thereby a resin film containing diamond particles were obtained. This resin film was sandwiched between a glass plate on which a light-absorption layer was formed and a glass plate on which a light-absorption layer was not formed so as to have a structure (see FIG. 2) consisting of a glass plate, a light-absorption layer (aluminum vapor deposition film), a scattering layer (diamond-particle-containing resin film), and a glass plate. This laminate was placed in a rubber bag and degassed at a degree of vacuum of about 2.7 kPa (20 Torr) for 20 minutes and thereafter transferred to an oven at 90° C. in a state where the laminated was degassed, and the laminated was held at 90° C. for 30 minutes to be vacuum pressed; thereby the laminated glass was preliminary bonded. The preliminary bonded laminated glass was placed in an autoclave and permanently bonded at a temperature of 135° C. and a pressure of about 120 N/cm² (12 kg/cm²) for 20 minutes, and thereby the reflective screen was prepared.

Comparative Example 1

A reflective screen having a structure consisting of a glass plate, a scattering layer (diamond-particle-containing resin film), and a glass plate was prepared as same as the Example 1, except for not providing the light-absorption layer.

Comparative Example 2

A reflective screen having a structure consisting of a glass plate, a light-absorption layer (aluminum deposition film), a resin film, and a glass plate was prepared as same as the Example 1, except for not adding diamond particles.

Comparative Example 3

A reflective screen having a structure consisting of a glass plate, a resin film, and a glass plate was prepared as same as the Example 1, except for not containing diamond particles.

(Evaluation)

An image was projected from inside a room onto reflective screens of the Example 1 and the Comparative Examples 1 to 3 provided at a window portion of the room during daytime on a fine day, and the image projected on the corresponding screen was observed from the same side (projection side), and thereby transmissivity, sharpness of the image, and a viewing angle were evaluated. Note that, the reflective screen of the Example 1 and the reflective screen of the Comparative Example 2 were arranged such that the image is projected from the diamond-particle-containing resin film side and the resin film side, respectively.

The transmissivity was visually evaluated by observing the scenery outside the room through the screen from a side at which the image was observed. As a result, in the reflective screens of the Example 1 of the present invention and the Comparative Example 2, the scenery outside looked bit dark compared to the reflective screens of the Comparative Example 1 and the Comparative Example 3 but could be observed sufficiently sharply.

The sharpness of the image was visually evaluated by observing the image projected on the corresponding screen from the projection side. As a result, in the reflective screen of the Comparative Example 1, it was observed that the projected image looked whitish in overall color with thin contour because light from the outside of the room was strong. Further, in the reflective screens of the Comparative Example 2 and the Comparative Example 3, the hues of the projected image could hardly be distinguished, and the contour could hardly be recognized. In contrast, in the reflective screen of the Example 1 of the present invention, the color of the projected image was extremely vivid, and the contour was extremely clearly seen because the light from the outside of the room was suitably cut.

The viewing angle was visually evaluated by observing the image projected on the corresponding screen at an angle of 120 degrees on the projection side. Note that the observation angle is an angle to the normal line of the screen. As a result, in the reflective screen of the Comparative Example 1, the hues of the projected image could hardly be distinguished, and the contour could hardly be recognized. Further, in the reflective screens of the Comparative Example 2 and the Comparative Example 3, the projected images could hardly be recognized. In contrast, in the reflective screen of the Example 1 of the present invention, the color of the projected image was vivid, and the contour was clearly seen.

REFERENCE SIGNS LIST

1, 2, 3, 4, 5, 6 . . . reflective screen, 10, 10' . . . transparent substrate, 11 . . . colored substrate, 12 . . . transparent sheet, 13 . . . colored sheet, 20 . . . light-absorption layer, 30 . . . scattering layer, 31 . . . light-scatterer, 40 . . . hard coat layer, 101, 102, 103, 104 . . . sheet for reflective screen, 201 . . . reflective screen, 202 . . . projection device, 203 . . . vibration speaker, 204 . . . sound-collecting device.

The invention claimed is:

1. A reflective screen displaying an image by projected light, the reflective screen comprising:
   a transparent substrate;
   a light-absorption layer provided in direct contact with the transparent substrate with or without an adhesive, the light-absorption layer absorbing visible light; and
   a scattering layer provided in direct contact with the light-absorption layer with or without an adhesive, the scattering layer scattering the projected light,
   wherein
   the light-absorption layer has 30-90% transmittance with respect to visible light, and
   the scattering layer contains a light-scattering medium consisting of diamond particles and/or metallic inorganic particles.

2. The reflective screen according to claim 1, wherein the transparent substrate consists of glass or transparent polymer resin.

3. The reflective screen according to claim 1, wherein the light-absorption layer is a layer consisting of a metal thin film, a dielectric multilayer film, or a film containing dye or pigment.

4. The reflective screen according to claim 1, wherein the scattering layer consists of glass or polymer resin containing a light-scattering medium consisting of diamond particles and/or metallic inorganic particles.

5. The reflective screen according to claim 1, comprising a hard coat layer on its surface.

6. A reflective screen displaying an image by projected light, the reflective screen comprising:
   a colored substrate having 30-90% transmittance with respect to visible light; and
   a scattering layer provided on the colored substrate, the scattering layer scattering the projected light,
   wherein the scattering layer contains a light-scattering medium consisting of diamond particles or diamond particles and metallic inorganic particles.

7. The reflective screen according to claim 6, wherein the colored substrate consists of glass or polymer resin containing dye or pigment.

8. The reflective screen according to claim 6, wherein the scattering layer consists of glass or polymer resin containing a light-scattering medium consisting of diamond particles or diamond particles and metallic inorganic particles.

9. The reflective screen according to claim 6, comprising a hard coat layer on its surface.

10. A sheet for a reflective screen displaying an image by projected light, the sheet for the reflective screen comprising:
    a transparent sheet consisting of transparent polymer resin, the transparent sheet having flexibility;
    a light-absorption layer provided in direct contact with the transparent substrate with or without an adhesive, the light-absorption layer absorbing visible light; and
    a scattering layer provided in direct contact with the light-absorption layer with or without an adhesive, the scattering layer scattering the projected light,
    wherein
    the light-absorption layer has 30-90% transmittance with respect to visible light, and
    the scattering layer contains a light-scattering medium consisting of diamond particles and/or metallic inorganic particles.

11. A sheet for a reflective screen displaying an image by projected light, the sheet for the reflective screen comprising:
    a colored sheet consisting of polymer resin, the colored sheet having flexibility and 30-90% transmittance with respect to visible light; and
    a scattering layer provided on the colored sheet, the scattering layer scattering the projected light,
    wherein the scattering layer contains a light-scattering medium consisting of diamond particles or diamond particles and metallic inorganic particles.

* * * * *